United States Patent [19]

Ergun et al.

[11] Patent Number: 4,597,832
[45] Date of Patent: Jul. 1, 1986

[54] APPARATUS FOR CONVERTING BIOMASS TO A PUMPABLE SLURRY

[75] Inventors: Sabri Ergun, Hillsborough; Larry L. Schaleger, Oakland; James A. Wrathall, Berkeley; Nasser Yaghoubzadeh, El Cerrito, all of Calif.

[73] Assignee: The United States of America as represented by the United States Department of Energy, Washington, D.C.

[21] Appl. No.: 307,560

[22] Filed: Oct. 1, 1981

[51] Int. Cl.[4] .................................... D21C 7/00
[52] U.S. Cl. ........................... 162/234; 162/243; 162/261; 162/237; 127/1
[58] Field of Search ............... 44/2, 1 E; 241/28; 48/DIG. 7; 162/261, 234, 243, 246, 4, 28, 14, 237; 127/37, 1

[56] References Cited

U.S. PATENT DOCUMENTS

| | | | |
|---|---|---|---|
| 1,793,095 | 2/1931 | Knoll | 162/261 X |
| 3,092,338 | 6/1963 | Reinhall | 241/28 X |
| 3,212,933 | 10/1965 | Hess et al. | 127/37 |
| 3,298,899 | 1/1967 | Laakso | 162/19 |
| 3,586,600 | 6/1971 | Rich et al. | 162/243 X |
| 3,881,985 | 5/1975 | Simmons et al. | 162/243 X |
| 4,002,528 | 1/1977 | Laakso | 162/28 X |
| 4,025,356 | 5/1977 | Nyman et al. | 127/1 |
| 4,072,274 | 2/1978 | Syrjanen | 162/28 X |
| 4,187,141 | 2/1980 | Ahrel | 162/28 X |
| 4,339,206 | 7/1982 | Ahs | 162/243 X |

FOREIGN PATENT DOCUMENTS

| | | | |
|---|---|---|---|
| 2740765 | 3/1979 | Fed. Rep. of Germany | 366/336 |
| 53-08801 | 4/1978 | Japan | 162/28 |
| 54-128863 | 10/1979 | Japan | 366/336 |

OTHER PUBLICATIONS

C & E News; vol. 20; 10/8/79; "Continuous Cellulose to Glucose Process".

Primary Examiner—Kenneth Schor
Attorney, Agent, or Firm—L. E. Carnahan; Roger S. Gaither; Judson R. Hightower

[57] ABSTRACT

An apparatus used in the pretreatment of wood chips in a process for converting biomass to a liquid hydrocarbonaceous fuel. The apparatus functions to break down the wood chips to a size distribution that can be readily handled in a slurry form. Low maintenance operation is obtained by hydrolyzing the chips in a pressure vessel having no moving parts.

12 Claims, 1 Drawing Figure

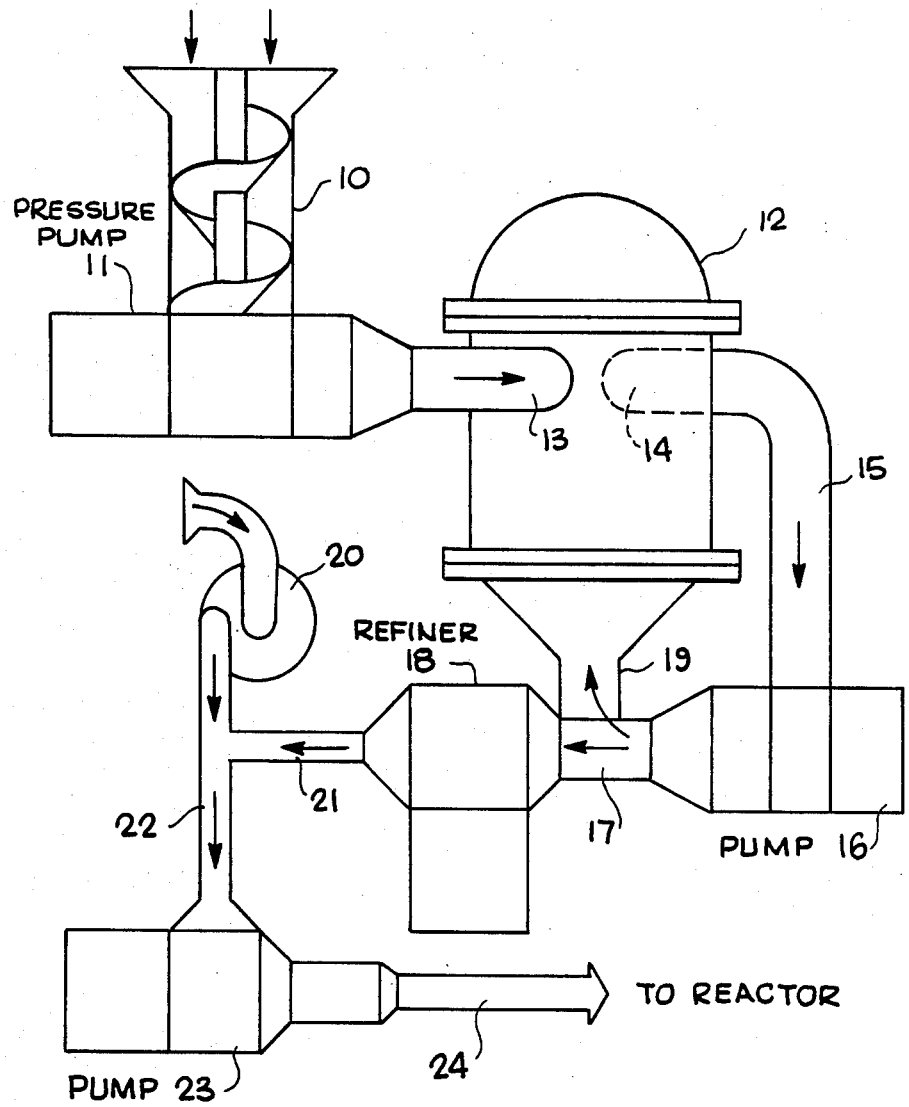

APPARATUS FOR CONVERTING BIOMASS TO A PUMPABLE SLURRY

The Government has rights in the invention described herein, which arose at the Lawrence Berkeley Laboratory in the course of, or under, Contract No. W-7405-ENG-48 between the University of California and the U.S. Department of Energy.

BACKGROUND OF THE INVENTION

The invention relates to conversion of biomass to a liquid hydrocarbonaceous fuel, particularly to an apparatus for converting biomass to a pumpable slurry, and more particularly to an apparatus for hydrolyzing lignocellulosic materials, particularly wood chips, in a pressure vessel having no moving parts.

Various types of apparatus have been developed for utilizing biomass, such as wood chips, for a variety of applications. These prior known apparatus are exemplified by U.S. Pat. No. 3,298,899 issued Jan. 17, 1967, to O. A. Laakso; U.S. Pat. No. 3,586,600 issued June 22, 1971, to J. P. Rich et al; U.S. Pat. No. 4,002,528 issued Jan. 11, 1977, to O. A. Laakso; and U.S. Pat. No. 4,025,356 issued May 24, 1977, to G. A. Nyman et al. These prior apparatus include a single-pass type pressure vessel in which the biomass is digested or broken down to the desired size, etc., as exemplified by above-referenced U.S. Pat. Nos. 3,298,899 and 3,586,600.

Recently, substantial effort has been directed to processes and apparatus for the production of fuel from biomass. The known apparatus for converting biomass, such as wood chips, wood pulp, newspapers, etc., had considerable difficulty with clogging of pipes, etc., because there was no suitable inexpensive means for producing a slurry from the chips. Also the prior apparatus utilized pressure vessels with seals for the introduction of rotating shafts, etc., for circulating or pressurizing the material as it passes through the pressure vessel. Such an apparatus is described in C & EN News, Vol. 20, Oct. 8, 1979, entitled "Continuous Cellulose-to-Glucose Process". A constant maintenance problem has resulted from the breakdown of these pressure vessel seals. Thus, substantial time and effort have been directed to resolving this maintenance problem.

SUMMARY OF THE INVENTION

It is an object of the invention to provide a low-maintenance apparatus for converting biomass which overcomes the problems associated with pressure vessel seals.

A further object of the invention is to provide an apparatus for use in the pretreatment of biomass in the process for converting the biomass to a hydrocarbonaceous fuel.

Another object of the invention is to provide an apparatus for converting wood chips to a pumpable slurry.

Another object of the invention is to provide a low-maintenance apparatus for hydrolyzing lignocellulosic materials, particularly wood chips, which has the capability of recirculating partially processed biomass through the pressure vessel thereof without moving parts within the pressure vessel.

The above objects are carried out by providing an apparatus for hydrolyzing wood chips to produce a pumpable slurry which utilizes a heated pressure vessel having no moving parts therein and which has the capability of recirculation of the chips through the pressure vessel by an external pumping arrangement. More specifically, the wood chips and an associated processing solution are fed into a heated pressure vessel for processing as known in the art, whereafter the processed chips are passed through a refiner, resulting in a pumpable slurry, or recirculated through the pressure vessel via an externally located pump. By this arrangement, the wood chips are converted to a pumpable slurry while the problems relating to seals about rotating elements in the pressure vessel are totally eliminated, thus substantially reducing the maintenance of the apparatus.

BRIEF DESCRIPTION OF THE DRAWINGS

The single FIGURE illustrates an embodiment of an apparatus made in accordance with the invention.

DETAILED DESCRIPTION OF THE INVENTION

The present invention is directed to an apparatus utilized in the conversion of biomass, such as wood chips, to a liquid hydrocarbonaceous fuel, by converting the biomass to a pumpable slurry. By use of the apparatus, the chips are broken down into a size distribution that can be readily handled in a slurry form. Low maintenance operation is obtained by hydrolyzing the chips in a pressure vessel having no moving parts.

In an example of a process for converting wood chips to a hydrocarbonaceous fuel, the chips are mixed with dilute sulfuric acid to form a slurry. The slurry is heated to 180° C. for 45 minutes to produce a particulate suspension of wood in an acid solution, whereafter that slurry is processed to produce the fuel. The temperature may be varied from about 150°-200° C. with the time varying as temperature varies. Since the present invention is only concerned with producing a pumpable slurry for use in the overall process, details of the overall process are not deemed necessary.

The apparatus of the present invention provides a continuous flow process in which lignocellulosic materials such as wood chips, exemplified by Douglas fir chips, are hydrolyzed under pressure in a heated pressure vessel, recirculated as needed, after which the chips are readily broken down into smaller particles in a refiner (grinder). The unique combination of components permits the use of a hydrolyzer pressure vessel with no moving parts. Thus, the maintenance problems—especially those associated with the pressure seals where rotating drive shafts enter the vessel—are resolved.

Referring now to the embodiment of the apparatus illustrated in the drawing, wood chips about 0.5 in. across, and a dilute solution of sulfuric acid are continuously fed by an atmospheric screw feed mechanism 10 into a pressure pump assembly 11, where the mixture is pressurized to 200-300 lb. per square inch. The dilute solution of sulfuric acid, for example, may consist of 0.5 wt % essentially pure $H_2SO_4$ in $H_2O$. The thus pressurized mixture is directed by pump 11 into a jacketed pressure vessel 12 through a tangential inlet 13 so that maximum mixing occurs. Pressure vessel 12 is provided with an outlet 14 which is tangential in the opposite direction to inlet 13 so that the incoming mixture does not immediately exit the vessel 12. The jacketed pressure vessel 12 is constructed such that steam, from a source not shown, is supplied to the jacket so that the temperature within the vessel can be maintained at about 180° C. Jacketed pressure vessels are known in the art and further description thereof is believed unnecessary.

The mixture or material exiting vessel 12 via outlet 14 is directed through a pipe or conduit 15 to a pump 16 which directs the material as indicated by flow arrows via a pipe or conduit 17 into a refiner (wet grinder) 18 and/or into the bottom of vessel 12 for recirculation via piping 19. While not shown, the pipe 17 may be provided with a control member, such as a simple flap valve, for controlling the amount of material to be returned to the pressure vessel 12. The recirculation of the material through pressure vessel 12 enhances the mixing and agitation in the vessel so that mechanical stirring is unnecessary, thereby avoiding the maintenance problems discussed above. For example, with the pressure vessel at 180° C., the mixture produces a particulate suspension of wood in an acid solution when processed for about 45 minutes.

As pointed out above, at least some of the material from pump 16 is passed through refiner (wet grinder) 18. By this stage, hemicellulose in the chips going into the refiner has been largely hydrolyzed and the chips broken into pieces less than 0.25 in. across. Loss of structural integrity of the wood occurs, conferring friability to the hydrolyzed wood chips. Owing to the conversion of the hemicellulose in vessel 12, the larger pieces are easily broken down in the refiner to a 40-mesh screen size (about 400 microns particle size) or smaller. A neutralizing agent, such as sodium carbonate or calcium hydroxide, is added by the mechanism indicated at 20 to the refined material (mixture) exiting from refiner 18 via pipe 21 to form a slurry which is directed through a pipe 22 via pump 23 to a reactor, indicated by arrow 24 and legend, where with proper treatment a liquid hydrocarbonaceous fuel can be obtained.

It has thus been shown that the present invention provides an apparatus for producing a pumpable slurry from wood chips by passing and recirculating the chips through a heated pressure vessel without any mechanical mixers or agitators within the vessel, thereby eliminating the maintenance problems associated therewith. Thus, the apparatus of the invention fulfills a requirement for producing a pumpable slurry from wood chips while requiring relatively little maintenance.

While a particular embodiment of the apparatus of the invention has been illustrated, such illustration is not intended to be limiting, since modifications will become apparent to those skilled in the art, and it is intended to cover in the appended claims all such modifications as come within the scope of the invention.

What is claimed is:

1. An apparatus for converting lignocellulosic material to a pumpable slurry comprising: means for receiving material to be converted, means for pressurizing the material to be converted, heated means operatively connected to said receiving means and said pressurizing means and having no moving mechanical elements therein for treating the material under pressure and temperature for a period of time, means operatively connected to said heated treating means for recirculating at least a portion of the treated material through said heated treating means, and refining means operatively connected to receive a portion of said treated material from said recirculating means for producing finely ground particles of said treated material.

2. The apparatus of claim 1, additionally including means for supplying said lignocellulosic material and a solution for treating same to said means for receiving and pressurizing the material.

3. The apparatus of claim 1, additionally including means for mixing a neutralizing agent with said finely ground particles of said treated material.

4. The apparatus of claim 1, wherein said means for pressurizing the material consists of a pressure pump capable of pressurizing the material to 200-300 pounds per square inch.

5. The apparatus of claim 4, wherein said heated means for treating the material consists of a heated pressure vessel having an internal temperature of about 150°-200° C., said pressure vessel having no moving mechanical elements therein and being constructed to include a tangential inlet and a tangential outlet, said outlet being tangential in an opposite direction to that of said inlet to provide for maximum mixing of the biomass material and a solution for treating same, said inlet being connected to said means for receiving and pressurizing the material.

6. The apparatus of claim 5, wherein said means for recirculating at least a portion of said material consists of a pump having an inlet connected to said outlet of said pressure vessel and an outlet operatively connected to at least a lower end portion of said pressure vessel, whereby the recirculated material enhances the mixing and agitation in the material in said pressure vessel.

7. The apparatus of claim 6, wherein said refining means consists of a grinder operatively connected to said outlet of said pump for breaking down the treated material to a particle size of not greater than about 400 microns.

8. The apparatus of claim 7, additionally including means for adding a neutralizing agent to the material after it has passed through said grinder, and means for directing the thus treated and neutralized material to a point of use.

9. The apparatus of claim 8, wherein said means for receiving material to be converted includes a screw feed mechanism for supplying the material and the treating solution to said pressure pump.

10. The apparatus of claim 2, wherein said lignocellulosic material consists of wood chips.

11. The apparatus of claim 5, wherein said lignocellulosic material consists of wood chips.

12. The apparatus of claim 9, wherein said lignocellulosic material consists of wood chips, and wherein said treating solution consists of dilute sulfuric acid.

* * * * *